| | | |
|---|---|---|
| # United States Patent [19] | [11] | 3,746,375 |
| Funk | [45] | July 17, 1973 |

[54] PRESSURE CONTAINMENT PENETRATION NOZZLE

[75] Inventor: Forrest E. Funk, San Jose, Calif.

[73] Assignee: General Electric Company, San Jose, Calif.

[22] Filed: Sept. 10, 1969

[21] Appl. No.: 856,586

[52] U.S. Cl. .................. 285/286, 29/157, 285/189
[51] Int. Cl. ............................................ F16l 13/02
[58] Field of Search ..................... 29/157 R, 157 C, 29/157 T, 157.3 C; 220/27, 89 A, DIG. 29, 67; 285/286, 189, 18, 21

[56] References Cited
UNITED STATES PATENTS

| 244,042 | 7/1881 | Farrar | 220/27 |
|---|---|---|---|
| 1,081,555 | 12/1913 | Russell | 220/27 |
| 1,271,215 | 7/1918 | Platt | 220/27 |
| 1,312,901 | 8/1919 | Finley | 220/27 |
| 1,891,826 | 12/1932 | McGinnis | 220/27 |
| 2,233,455 | 3/1941 | Larson | 220/DIG. 29 |
| 2,352,754 | 7/1944 | Anderson | 220/DIG. 29 |
| 2,934,588 | 4/1960 | Ronci | 220/DIG. 29 |
| 3,178,811 | 4/1965 | Fuller | 220/DIG. 29 |

Primary Examiner—Richard J. Herbst
Assistant Examiner—James W. Davie
Attorney—Ivor J. James, Jr., Samuel E. Turner, Frank L. Neuhauser, Oscar B. Waddell and Joseph B. Forman

[57] ABSTRACT

A pre-prepared penetration nozzle for passing electrical conductors or pipes through the walls of a pressure containment vessel which eliminates the necessity of field preparation of weld surfaces.

9 Claims, 7 Drawing Figures

INVENTOR:
FORREST E. FUNK

BY: *Samuel E. Turner*
ATTORNEY

PRESSURE CONTAINMENT PENETRATION NOZZLE

BACKGROUND

Pressure containments with provision for passing electrical conductors and piping through the containment vessel walls are in use for various purposes. A notable example is the housing of a nuclear reactor. Typically the reactor core is contained in a reactor vessel constructed of steel. The reactor vessel, in turn, is housed in a containment building or vessel usually formed of concrete and having walls of several feet in thickness. The containment vessel thus provides biological shielding and it is pressure sealed to prevent the escape of vapors and liquids. For operation of the reactor, it is necessary to pass a variety of pipes and electrical conductors through the wall of the containment vessel. To accommodate these pipes and conductors, penetration nozzles or tubes are placed through the walls of the containment vessel during its construction. In a typical nuclear plant as many as 60 penetration nozzles, ranging from 6 inches to 2 feet in diameter, may be required.

To provide pressure sealing, the pipes and electrical conductors are sealed in penetration devices fitted with headers and the headers are welded to the penetration nozzles (or flanges for mounting the headers may be welded to the penetration nozzles). A serious problem arises in making welds of this type for the following reasons.

After construction of the containment vessel and before installation of the penetration devices in the penetration nozzles, the vessel must be temporarily sealed and pressure tested. This necessitates the sealing of the penetration nozzles which is accomplished by welding sealing caps or covers over at least one end. After the pressure testing, the sealing caps are removed from the penetration nozzles by torch cutting. As is well-known torch cutting, particularly under field conditions, is not a precision operation. Thus it is found that the torch cut ends of the penetration nozzles provide an inadequate weld preparation surface for the headers or flanges that must now be welded to the nozzles.

The specifications for such nozzle-to-header or flange weld preparations are given by ASME Boiler and Pressure Code Section III, Class B Vessel.

To make proper welds conforming to this code provision it has been found necessary to field machine or grind the torch cut ends of the nozzles to thereby provide an adequate weld preparation. Such field machining is very expensive and time consuming, costing in the order of $24,000 and requiring about 2,000 man-hours for the some 20 nozzles of a typical pressure containment for a nuclear plant or a cost of about $1200 and 100 man-hours for each field machined nozzle. By contrast a nozzle can be prepared in factory for a cost of about $14 and 1 man-hour.

SUMMARY

Objects of this invention are to eliminate the necessity of field preparation of penetration nozzle weld surfaces and to provide a penetration nozzle arrangement which allows removal of temporary pressure seals without destroying the weld preparation.

These and other objects are accomplished by preinstallation machining (which thus may be performed in factory) of a circumferential cut-off groove near the end of the penetration nozzle. This allows sealing of the nozzle end for containment pressure testing and subsequent cutting off of this end of the nozzle along the bottom of the groove by torch thereby leaving the previously machined groove surfaces as an acceptable weld preparation to receive the flanges of the penetration device.

Alternatively, the penetration nozzle may be formed with prepared or machined ends and the cut-off groove may be provided by welding a pre-prepared nozzle extension to one of the prepared ends of the nozzle.

BRIEF DESCRIPTION OF THE DRAWING

The invention is described more specifically hereinafter with reference to the accompanying drawing wherein.

GENERAL DESCRIPTION

Figure 1:
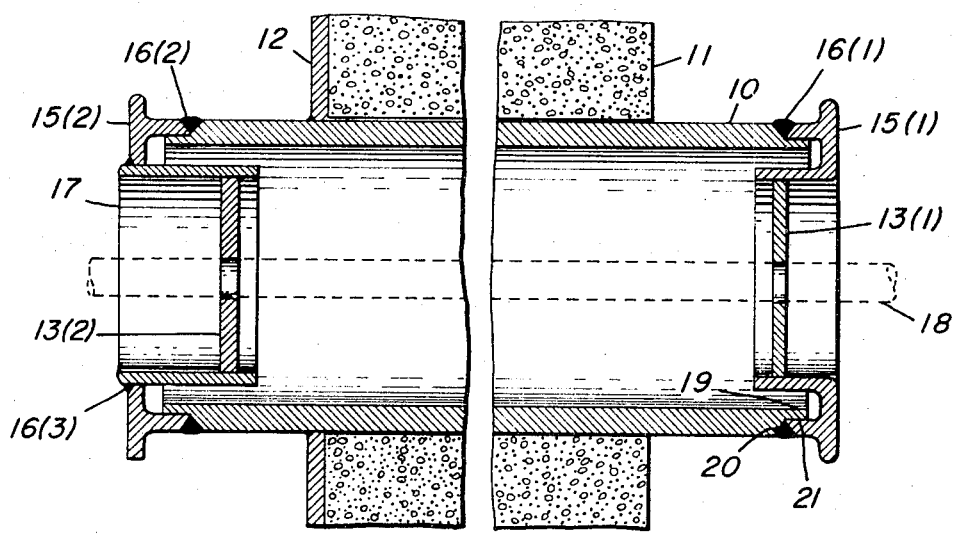
FIG. 1 is a cross section view illustrating the general form of a penetration device contained in a penetration nozzle as installed through the wall of a containment vessel.

Shown in FIG. 1 is a penetration assembly installed in a penetration nozzle 10 positioned through a concrete wall 11 of a containment vessel.

A typical penetration nozzle 10 is formed of a steel pipe of, for example, from 8 to 24 inches in diameter. The length of the nozzle may vary, for example, from 3 to 12 feet depending upon the thickness of the containment wall 11. A member 12, on the inside of the containment, is welded to the nozzle 10. The member 12 may be a steel liner of the containment vessel or a suitable flange.

The penetration assembly includes an outer flange 15(1) attached to the nozzle 10 by a weld 16(1), an inner flange 15(2) attached to the nozzle 10 by a weld 16(2) and a flange extension 17 attached to the flange 15(2) by a weld 16(3). This flange arrangement supports a pair of spaced headers 13(1) and 13(2). The electrical conductors or pipes to be passed through the penetration assembly are shown, generally, by the dashed line 18 and they are normally vapor and pressure sealed to the headers 13(1) and 13(2), for example, by a potting compound such as an epoxy resin.

As illustrated in FIG. 1, the ends of the nozzle 10 are machined to receive the flanges 15(1) and 15(2), each machined end including an extension 19 and a tapered weld surface 20. The extension 19 provides a flange receiving surface 21 which mates with and supports the flange during welding of the flange to the nozzle.

As mentioned hereinbefore, when construction of the containment vessel is completed, with penetration nozzles 10 installed and before completion of the penetration assembly, the vessel is temporarily sealed and pressure tested. This requires temporary closure of the penetration nozzles which is usually accomplished by welding a cover or cap over one end of each of the nozzles. When the containment pressure testing is completed these caps are removed by means of a cutting torch. This process destroys any weld preparation at that end of the nozzle and necessitates expensive field machining to prepare or restore that end for receiving the penetration flange if a proper welding of the flange to the nozzle in accordance with the applicable code is to be achieved.

FIRST EMBODIMENT

Figure 2A:
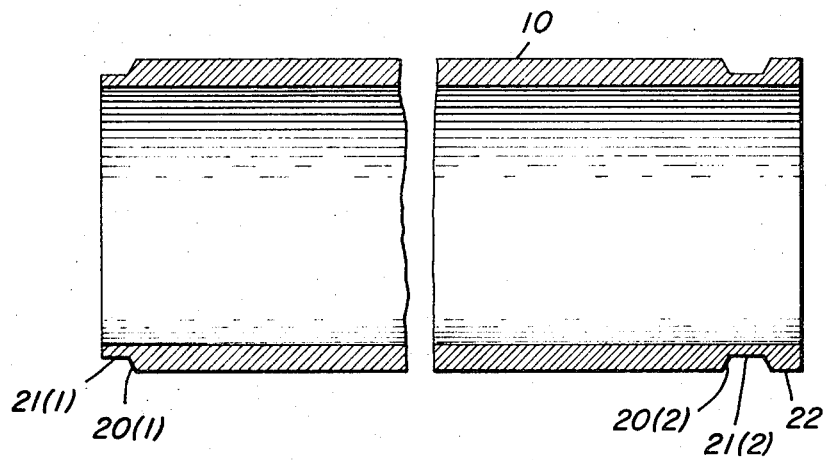
FIG. 2a is a longitudinal cross section view illustrating a penetration nozzle factory prepared with a cut-off groove in accordance with a first embodiment of the invention.

In accordance with a first embodiment of the invention expensive field machining is eliminated by factory pre-preparation of the penetration nozzle 10 as illustrated in FIG. 2a. As shown in FIG. 2a the left end of the nozzle is machined with the flange receiving surface 21(1) and the tapered weld surface 20(1) so that no further preparation of this end is required in the field. The right end of the nozzle is machined with a groove which also provides a pre-prepared flange receiving surface 21(2) and a tapered weld surface 20(2). Significantly, however, the end of the nozzle is formed with an extended or cap-receiving portion 22.

Figure 2B:
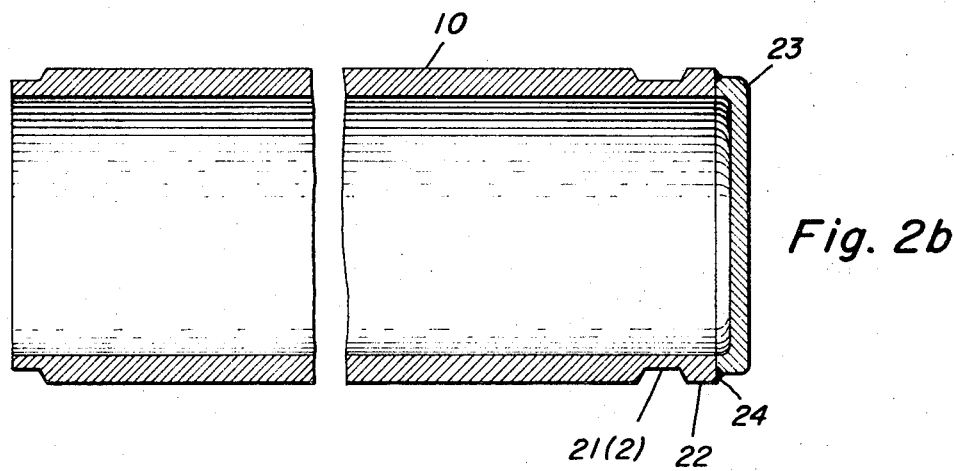
FIG. 2b illustrates the penetration nozzle of FIG. 2a with a sealing cap installed.

Sealing of the nozzle 10 for pressure testing purposes is illustrated in FIG. 2b wherein a cap 23 is attached to the cap-receiving portion 22 by a weld 24.

Figure 2C:
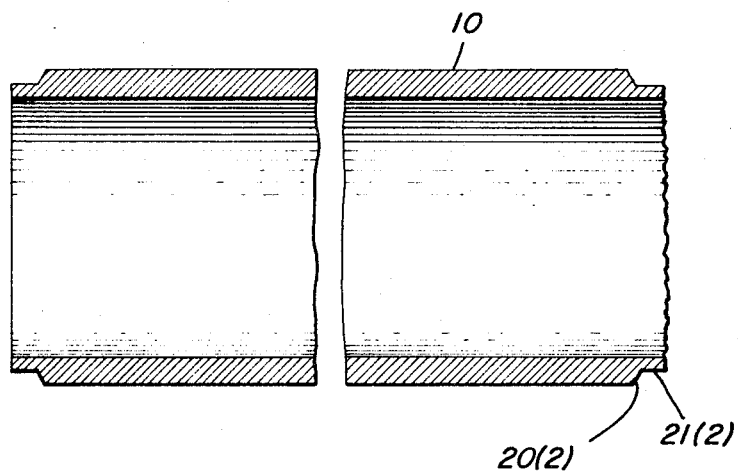
FIG. 2c illustrates the penetration nozzle of FIG. 2b with the sealing cap and excess end cut off by torch.

When the pressure testing is completed, the cap 23 and the cap receiving portion 22 are removed by cutting through the nozzle along the right-hand edge of the surface 21(2) as illustrated in FIG. 2c. Any protuberances above the surface 21(2) resulting from the cutting simply and quickly may be removed with, for example, a hand held grinder. Thus this process leaves the pre-prepared weld surface 20(2) and the flange-receiving surface 21(2) intact whereby no field preparation or restoration of these surfaces is required.

SECOND EMBODIMENT

Figure 3A:
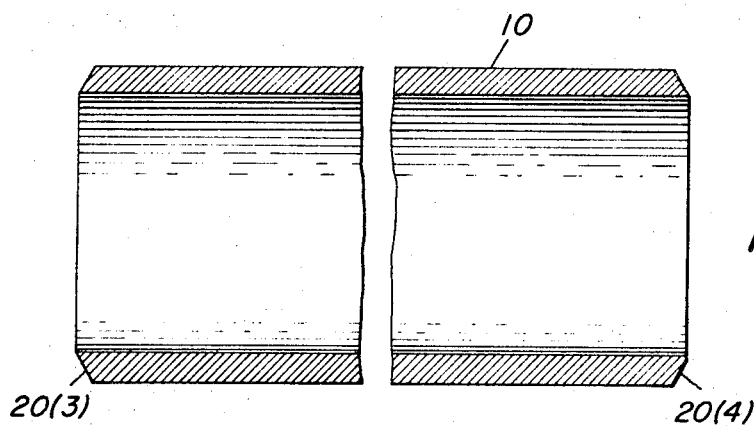
FIG. 3a illustrates a penetration nozzle with machined or prepared ends.

The penetration nozzle may be received and installed in the containment with pre-machined tapered ends as illustrated in FIG. 3a. This situation presents two difficulties. First, while the tapered ends provide suitable weld surfaces 20(3) and 20(4), no flange receiving surface (such as the surface 21(1), FIG. 2a), is provided for supporting and aligning the penetration flanges during welding. Second, the welding of a temporary sealing cap to either end destroys the weld preparation at that end and necessitates field restoration when the cap is removed.

Figure 3B:
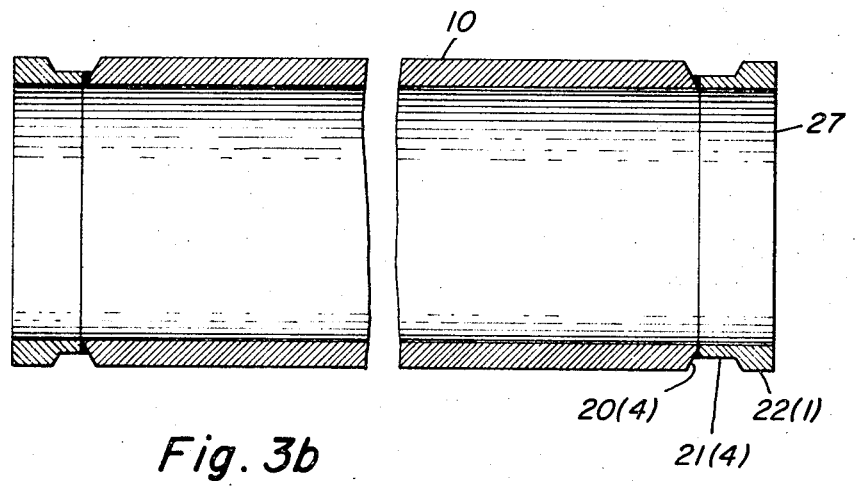
FIG. 3b illustrates the attachment of stepped rings to the penetration nozzle of FIG. 3a to form the cut-off grooves in accordance with a second embodiment of the invention.

These difficulties are overcome in accordance with the second embodiment of the invention as illustrated in FIG. 3b. A nozzle extension 27 in the form of a stepped ring is welded to each end of the nozzle 10 to provide a flange receiving surface 21(4) and a cap-receiving portion 22(1). The extra thickness of the cap receiving portion 22(1) aids in preventing distortion of the flange receiving portion 21(4) during its welding to the nozzle 10. With the nozzle extensions 27 installed, and the cap receiving portion 22(1) removed from the left end, the nozzle of FIG. 3b is the functional equivalent of the pre-prepared nozzle of FIG. 2a. A temporary sealing cap can be welded to the cap receiving portion 22(1) and this portion subsequently can be cut off without detriment to the flange receiving portion 21(4) or the weld surface 20(4).

Figure 3C:
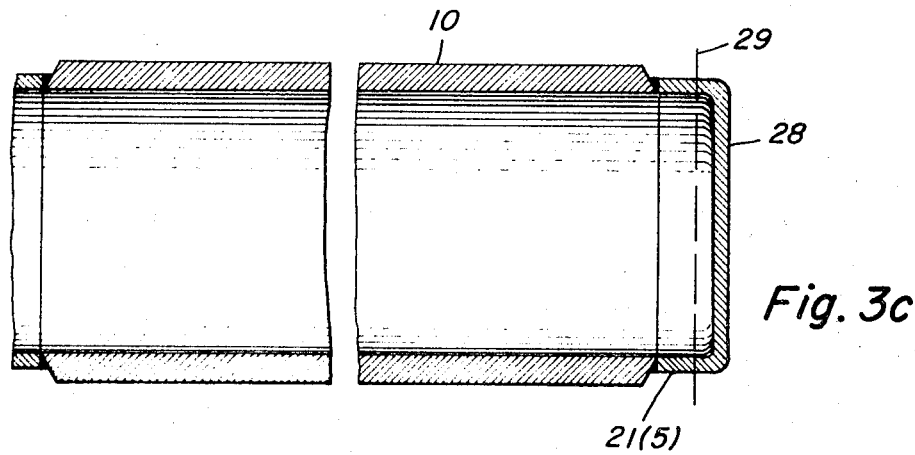
FIG. 3c illustrates a combined stepped ring and cap.

Alternatively and advantageously the temporary sealing cap and the nozzle extension can be formed of a standard cap as illustrated in FIG. 3c. A combined cap and extension 28 is formed with a pre-prepared flange receiving surface 21(5). After pressure testing of the containment is completed, the cap may be cut off along the dashed line 29 leaving the penetration nozzle fully prepared to receive the penetration flanges.

Thus what has been described is a method of eliminating expensive and time consuming field preparation in the installation of penetration assemblies through the walls of a pressure containment vessel.

While illustrative embodiments of the invention have been described herein, modifications and adaptations thereof may be made by those skilled in the art without departure from the spirit and scope of the invention as defined by the following claims.

What is claimed is:

1. A penetration nozzle for a containment vessel comprising: an elongated hollow nozzle member having a body portion of substantially uniform outside diameter; a first prepared weld surface at one end of said member; a first flange for welding to said first prepared weld surface, said first flange having a cylindrical portion of inside diameter less than said outside diameter of said body portion of said member; a first prepared flange receiving surface at said one end of said member outboard of said first weld surface, said first flange receiving surface having an outside diameter about equal to the inside diameter of said first flange so that said first flange fits over said first flange receiving surface and is located thereby adjacent said first weld surface; a second prepared weld surface at the other end of said member; a second flange for welding to said second prepared weld surface, said second flange having a cylindrical portion of inside diameter less than said outside diameter of said body portion of said member; a second prepared flange receiving surface at said other end of said member outboard of said second weld surface, said second flange receiving surface having an outside diameter about equal to the inside diameter of said portion of said second flange so that said second flange fits over said second flange receiving surface and is located thereby adjacent said second weld surface; and a longitudinal extension from said second flange receiving surface for receiving a temporary nozzle sealing member.

2. The penetration nozzle of claim 1 wherein the planes of said first and second prepared weld surfaces are at an angle to the longitudinal axis of said nozzle.

3. The penetration nozzle of claim 2 wherein said planes of said first and second flange receiving surfaces are substantially parallel to the longitudinal axis of said nozzle.

4. The penetration nozzle of claim 1 wherein said second weld surface and said second flange receiving surface are formed by a circumferential groove in said nozzle.

5. A penetration nozzle for a containment vessel comprising: an elongated hollow nozzle member having a body portion of substantially uniform outside diameter; a first prepared weld surface at one end of said member; a first flange for welding to said first prepared weld surface, said first flange including a cylindrical portion of inside diameter less than the outside diameter of said body portion of said member; a first longitudinal extension welded to said first weld surface and having at least a portion thereof adjacent said first weld surface of outside diameter about equal to the inside diameter of said cylindrical portion of said first flange for receiving and locating said first flange adjacent said first weld surface; a second prepared weld surface at the other end of said member; a second flange for welding to said second prepared weld surface, said second flange including a cylindrical portion of inside diameter less than the outside diameter of said body portion of said member; a second longitudinal extension welded to said second weld surface and having at least a portion thereof adjacent said second weld surface of outside diameter about equal to the inside diameter of said cylindrical portion of said second flange for receiving and locating said second flange adjacent said second weld surface.

6. The penetration nozzle of claim 5 wherein the planes of said first and second prepared weld surfaces are at an angle to the longitudinal axis of said nozzle.

7. The penetration nozzle of claim 5 wherein said second extension includes an end portion for receiving a temporary nozzle sealing member which may be cut off to remove said sealing member without detriment to said second weld surface.

8. The penetration nozzle of claim 5 wherein at least one of said extensions is formed with a closed outboard end for temporarily sealing said nozzle and wherein said one of said extensions is of sufficient length so that said closed outboard end may be cut off without detriment to the adjacent weld surface.

9. The penetration nozzle of claim 5 further including cylindrical flange extension longitudinally positioned within a central bore of said first flange.

* * * * *